United States Patent
Malhotra

(10) Patent No.: US 12,328,380 B2
(45) Date of Patent: Jun. 10, 2025

(54) SYSTEM AND METHOD FOR CONFIGURING SERIAL RECEIVER

(71) Applicant: Samsung Display Co., Ltd., Yongin-si (KR)

(72) Inventor: Gaurav Malhotra, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 310 days.

(21) Appl. No.: 17/847,091

(22) Filed: Jun. 22, 2022

(65) Prior Publication Data

US 2023/0388098 A1    Nov. 30, 2023

Related U.S. Application Data

(60) Provisional application No. 63/346,275, filed on May 26, 2022.

(51) Int. Cl.
*H04L 27/06* (2006.01)
*H04L 7/00* (2006.01)
*H04L 25/03* (2006.01)

(52) U.S. Cl.
CPC ...... *H04L 7/0079* (2013.01); *H04L 25/03878* (2013.01); *H04L 27/06* (2013.01)

(58) Field of Classification Search
CPC . H04L 27/06; H04L 25/03885; H04L 7/0079; H04L 25/03878
See application file for complete search history.

(56) References Cited

U.S. PATENT DOCUMENTS

| | | | |
|---|---|---|---|
| 6,735,259 B1 * | 5/2004 | Roberts | H04L 7/0337 375/316 |
| 7,286,597 B2 | 10/2007 | Buchwald et al. | |
| 7,769,110 B2 | 8/2010 | Momtaz | |
| 8,605,847 B2 | 12/2013 | Mobin et al. | |
| 8,737,549 B2 | 5/2014 | Mobin et al. | |
| 9,020,024 B1 | 4/2015 | Chaahoub et al. | |
| 9,438,409 B1 | 9/2016 | Liao et al. | |
| 9,565,037 B1 | 2/2017 | Liu et al. | |
| 9,912,470 B2 | 3/2018 | Yilmazer et al. | |
| 9,929,802 B2 | 3/2018 | Lipkin | |

(Continued)

FOREIGN PATENT DOCUMENTS

| CN | 112532550 A | 3/2021 |
|---|---|---|
| KR | 10-2134659 B1 | 7/2020 |
| WO | 2018/068824 A1 | 4/2018 |

OTHER PUBLICATIONS

Dunwell, D. et al., "Gain and Equalization Adaptation to Optimize the Vertical Eye Opening in a Wireline Receiver", 2010, 4 pages, IEEE.

(Continued)

*Primary Examiner* — Rahel Guarino
(74) *Attorney, Agent, or Firm* — Lewis Roca Rothgerber Christie LLP

(57) ABSTRACT

A system and method for configuring a serial receiver. In some embodiments, the method, includes: setting a threshold of a data slicer to a first threshold value; receiving, by the data slicer, a first data value; and setting the threshold of the data slicer to a second threshold value, the second threshold value being equal to the first threshold value plus a first adjustment, the first adjustment having the same sign as the first data value minus the first threshold value.

20 Claims, 8 Drawing Sheets

(56) References Cited

U.S. PATENT DOCUMENTS

| | | |
|---|---|---|
| 10,721,106 B1 | 7/2020 | Hormati |
| 10,749,661 B1 | 8/2020 | Visani et al. |
| 10,749,729 B1 * | 8/2020 | Wong .................. H03G 3/3052 |
| 11,139,949 B2 | 10/2021 | Nodenot et al. |
| 11,196,484 B2 | 12/2021 | Barrier, IV |
| 11,218,345 B2 | 1/2022 | Barrier, IV et al. |
| 2006/0256892 A1 * | 11/2006 | Momtaz ................ H04L 25/061 |
| | | 375/317 |
| 2010/0246722 A1 | 9/2010 | Campeau |
| 2017/0279428 A1 * | 9/2017 | Malhotra .......... H04L 25/03114 |
| 2021/0266200 A1 | 8/2021 | Yang et al. |

OTHER PUBLICATIONS

Mubarak, H. M. et al., "Single Adaptation of PAM4 Serial Link Transceiver Equalizers using Eye Diagram Monitoring", 2021 International Conference on Microelectronics (ICM), 2021, pp. 148-152, IEEE.

Zand, B. et al., "A 1-58.125-GB/s, 5-33dB IL Multi-protocol Ethernet-Compliant Analog PAM4 Receiver with 16 DFE Taps in 10nm", International Solid-State Circuits Conference, 2022, pp. 1-33, IEEE.

EPO Extended European Search Report dated Oct. 9, 2023, issued in corresponding European Patent Application No. 23174954.0 (9 pages).

\* cited by examiner

SYSTEM AND METHOD FOR CONFIGURING SERIAL RECEIVER

CROSS-REFERENCE TO RELATED APPLICATION(S)

The present application claims priority to and the benefit of U.S. Provisional Application No. 63/346,275, filed May 26, 2022, entitled "THRESHOLD CALIBRATION, FRONT END OPTIMIZATION FOR PAM4 IN HIGH-SPEED SERIAL LINKS", the entire content of which is incorporated herein by reference.

FIELD

One or more aspects of embodiments according to the present disclosure relate to serial data transmission, and more particularly to a system and method for configuring a serial receiver.

BACKGROUND

In a serial data receiver, various parameters values or settings may affect the performance of the serial data link of which the serial data receiver is a part. For example, poorly chosen parameter values may degrade the bit error rate of the serial link. Although it may be possible to measure the bit error rate to assess whether the performance of the serial link is acceptable, and to determine whether adjustments in parameter values result in improved performance, such testing may be time-consuming, especially if the bit error rate is low.

It is with respect to this general technical environment that aspects of the present disclosure are related.

SUMMARY

According to an embodiment of the present disclosure, there is provided a method, including: setting a threshold of a data slicer to a first threshold value; receiving, by the data slicer, a first data value; and setting the threshold of the data slicer to a second threshold value, the second threshold value being equal to the first threshold value plus a first adjustment, the first adjustment having the same sign as the first data value minus the first threshold value.

In some embodiments, the method further includes: receiving, by the data slicer, a second data value; and setting the threshold of the data slicer to a third threshold value, the third threshold value being equal to the second threshold value plus a second adjustment, the second adjustment having the same sign as the second data value minus the second threshold value.

In some embodiments, the first adjustment is within 50% of: a constant times: the difference between: the first data value and the first threshold value.

In some embodiments, the constant is between 0.5 and $2^{-20}$.

In some embodiments, the constant is equal to $2^{-V}$, wherein V is a positive integer between 1 and 20.

In some embodiments, the method further includes estimating a first eye opening from a plurality of data values including the first data value.

In some embodiments, the method includes calculating the difference between: a maximum data value of the plurality of data values and a minimum data value of the plurality of data values.

In some embodiments, the method further includes estimating a second eye opening, and selecting a second continuous time linear equalizer (CTLE) parameter set for operation, wherein: a first CTLE parameter set corresponds to the first eye opening, the second CTLE parameter set corresponds to the second eye opening, and the second eye opening is greater than the first eye opening.

In some embodiments, the method further includes estimating a second eye opening, and selecting a second clock skew for operation, the second clock skew being a second phase delay between a data slicer clock and a crossing slicer clock, wherein: a first clock skew corresponds to the first eye opening, the first clock skew being a first phase delay between the data slicer clock and the crossing slicer clock; the second clock skew corresponds to the second eye opening; and the second eye opening is greater than the first eye opening.

In some embodiments, the first data value is a data value of a plurality of 4-level Pulse Amplitude Modulation (PAM-4) data values.

In some embodiments, the first data value is a data value of a subset of the plurality of PAM-4 data values, the subset being the set of positive data values of the plurality of PAM-4 data values.

According to an embodiment of the present disclosure, there is provided a system, including: a processing circuit; and memory, operatively connected to the processing circuit and storing instructions that, when executed by the processing circuit, cause the system to perform a method, the method including: setting a threshold of a data slicer to a first threshold value; receiving, by the data slicer, a first data value; and setting the threshold of the data slicer to a second threshold value, the second threshold value being equal to the first threshold value plus a first adjustment, the first adjustment having the same sign as the first data value minus the first threshold value.

In some embodiments, the method further includes: receiving, by the data slicer, a second data value; and setting the threshold of the data slicer to a third threshold value, the third threshold value being equal to the second threshold value plus a second adjustment, the second adjustment having the same sign as the second data value minus the second threshold value.

In some embodiments, the first adjustment is within 50% of: a constant times: the difference between: the first data value and the first threshold value.

In some embodiments, the constant is between 0.5 and $2^{-20}$.

In some embodiments, the constant is equal to $2^{-V}$, wherein V is a positive integer between 1 and 20.

In some embodiments, the method further includes estimating a first eye opening from a plurality of data values including the first data value.

In some embodiments, the method includes calculating the difference between: a maximum data value of the plurality of data values and a minimum data value of the plurality of data values.

In some embodiments, the method further includes estimating a second eye opening, and selecting a second continuous time linear equalizer (CTLE) parameter set for operation, wherein: a first CTLE parameter set corresponds to the first eye opening, the second CTLE parameter set corresponds to the second eye opening, and the second eye opening is greater than the first eye opening.

According to an embodiment of the present disclosure, there is provided a display, including: a timing controller; and a driver integrated circuit, the driver integrated circuit including a data slicer; a processing circuit; and a memory connected to the processing circuit, the memory storing instructions that, when executed by the processing circuit, cause the driver integrated circuit to perform a method, the method including: setting a threshold of the data slicer to a first threshold value; receiving, by the data slicer, a first data value; and setting the threshold of the data slicer to a second threshold value, the second threshold value being equal to the first threshold value plus a first adjustment, the first adjustment having the same sign as the first data value minus the first threshold value.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
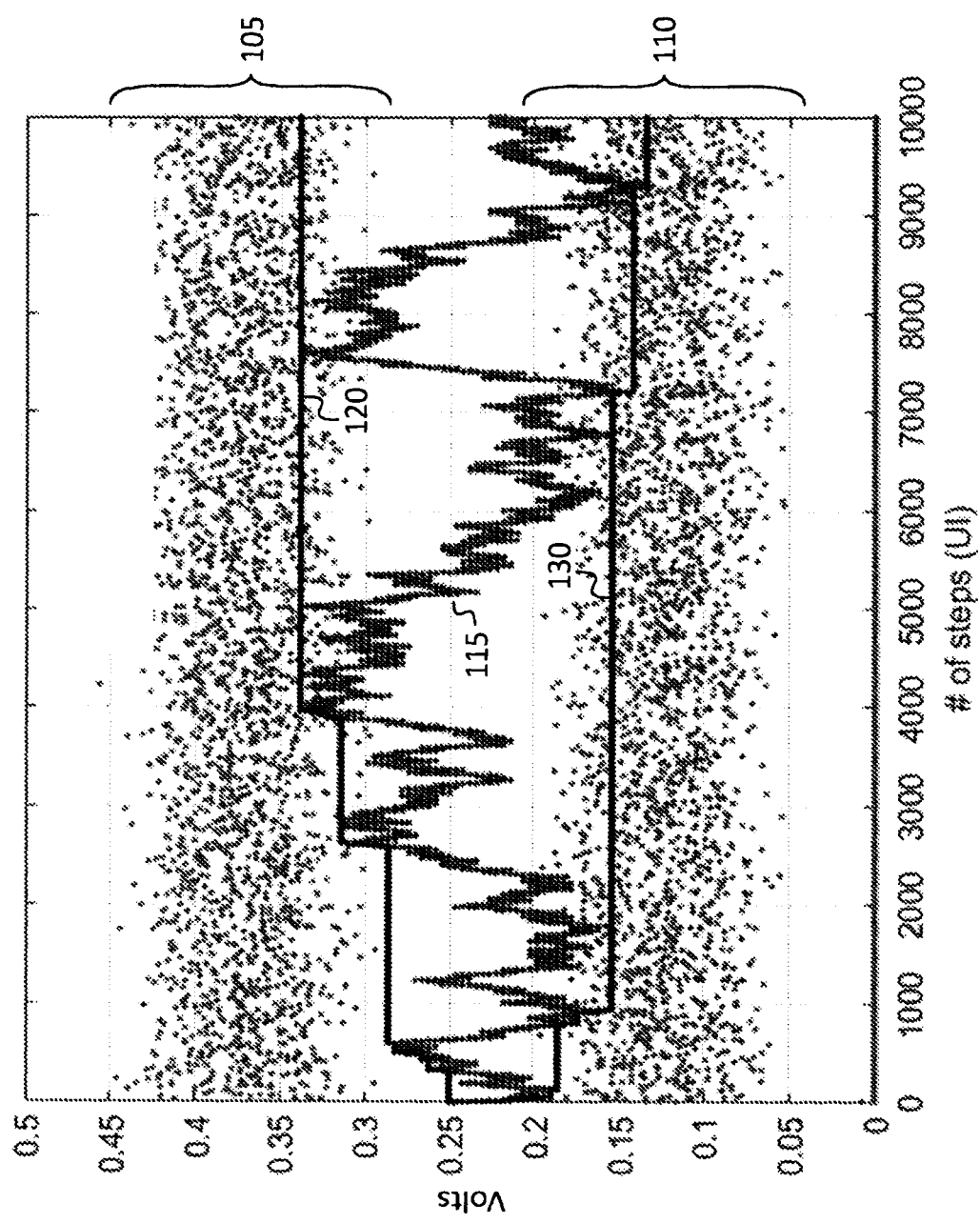
FIG. 1A is a graph of received data values and of a data slicer threshold, according to an embodiment of the present disclosure.

The detailed description set forth below in connection with the appended drawings is intended as a description of exemplary embodiments of a system and method for configuring a serial receiver provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a serial link it may be advantageous, in various circumstances, to adjust various parameters of the serial receiver so as to achieve acceptable performance (e.g., an acceptably low bit error rate) in the serial link. For example, the serial receiver may include a data slicer and a clock slicer, and (i) the threshold of the data slicer or (ii) the phase difference between the data slicer and the clock slicer may be adjusted. As another example, the receiver may include a continuous time linear equalizer (CTLE), which may have various parameters (e.g., time constants) that may be adjusted. Such adjustments may be made by monitoring the bit error rate (e.g., during the transmission of a known pseudorandom bit stream or of a bit stream encoded with forward error correction) and adjusting the parameter values in a direction of improving performance, e.g., using a gradient descent method. Such an approach may converge slowly, however, especially if bit error rates are low.

As such, in some embodiments, a method involving iterative adjustment of a data slicer threshold is used to estimate an eye opening or to estimate a threshold value that is centered between two analog levels of the received serial signal. The method may proceed as follows. First, the clock and data recovery (CDR) circuit of the receiver may be locked. This may be performed using a CDR acquisition signal transmitted for this purpose by the serial transmitter; this signal may consist of alternating high and low values (e.g., alternating ones and zeros). Once the clock and data recovery circuit is locked (or once the transmitter has transmitted the CDR acquisition signal for a certain period of time), the transmitter may begin normal operations, transmitting payload data (which may include arbitrary or quasi-random data). The receiver may then initialize the data slicer threshold, $d_{threshold}$, to any value within the voltage range of the data slicer (e.g., to the midpoint of the voltage range). Then each received analog data value (or each of a subset of the received analog data values, as discussed in further detail below) may be compared, by the data slicer, to the current threshold, $d_{threshold}$. The result of the comparison (i.e., the signal at the output of the data slicer) may be referred to as an error signal; it may be given by the following equation:

$$\text{Error}(k)=\text{sign}(\text{Input data}-d_{threshold}(k))$$

where "Input data" is a received (analog) data value. The threshold of the data slicer may then be adjusted by adding an adjustment as follows:

$$d_{threshold}(k+1)=d_{threshold}(k)+\mu*\text{Error}(k)$$

where $\mu$ is a constant less than 1. It may be seen that the adjustment has the same sign as the data value minus the threshold value.

For example, $\mu$ may be given by $\mu=2^{-V}$ where V is an integer, e.g., between 1 and 20. The adjustment may be equal to $\mu*\text{Error}(k)$ (as in the equation above), or it may be equal to a value within, e.g., 50% of $\mu*\text{Error}(k)$. This process may be repeated for a fixed number, N, of updates (where N may be programmable, e.g., with a value between 100 and 100,000). The receiver may track the minimum and maximum values of $d_{threshold}$ during this process.

FIG. 1A depicts a set of data values including a set of high data values 105 (taking on a range of values centered on a nominal value of about 0.37) and a set of low data values 110 (taking on a range of values centered on a nominal value of about 0.12). It may be seen (i) that the value of $d_{threshold}$ 115 changes according to a substantially random walk (for data values that are randomly distributed between the high value and the low value) when $d_{threshold}$ is within a central region between the high data values 105 and the low data values 110 (the likelihood of Error(k) being positive or negative being approximately equal in this region) (ii) that when $d_{threshold}$ approaches or is within the range of the high data values 105, it tends to decrease (the likelihood of Error(k) being negative, in this region, being greater than the likelihood of Error(k) being positive), and (iii) that when $d_{threshold}$ approaches or is within the range of the low data values 110, it tends to increase (the likelihood of Error(k) being positive, in this region, being greater than the likelihood of Error(k) being negative). As such, the maximum value $d_{threshold(max)}$ 120 of $d_{threshold}$ has a tendency to increase relatively rapidly at first, to change less frequently as the number of iterations grows larger, and to have a final value that is part-way within the set of high data values 105. Similarly, the minimum value $d_{threshold(min)}$ 125 of $d_{threshold}$ has a tendency to decrease relatively rapidly at first, to change less frequently as the number of iterations grows larger, and to have a final value that is part-way within the set of low data values 110.

Once enough iterations have been performed (e.g., 10,000 iterations in the example of FIG. 1A) such that $d_{threshold(max)}$ and $d_{threshold(min)}$ have reached values from which they are not expected to change significantly, the eye opening may be estimated as $d_{threshold(max)} - d_{threshold(min)}$, and the final value of the data slicer threshold, $d_{threshold\_final}$ may be set to the midpoint between $d_{threshold(max)}$ and $d_{threshold(min)}$, i.e., $$d_{threshold\_final} = (d_{threshold(max)} + d_{threshold(min)})/2.$$

The data slicer threshold for operation (i.e., the threshold to be used for receiving data) may then be set to $d_{threshold\_final}$. The estimated eye opening may be used for other adjustments, as discussed in further detail below.

The operation of this method may be understood from the following equations.

The error may be defined as follows: Error=sign(dthreshold–data) for k=1 to N. Then $$\text{Error}(k) = \text{sign}\left(d_{threshold}(k) - \sum_{n=-\infty}^{\infty} d_n h_{k-n}\right) \text{ and}$$

$$\text{Error}(k) = \text{sign}\left(d_{threshold}(k) - d_k h_0 - \sum_{\substack{n=-\infty \\ n \neq 0}}^{\infty} d_n h_{k-n}\right),$$

where $d_n$ is the $n^{th}$ data value and $h_n$ is the $n^{th}$ tap value. The update equation is:

$$d_{threshold}(k+1) = d_{threshold}(k) - \mu * \text{Error}(k)$$

E(Error)=0 (where E(Error) is the expected value of Error) implies
$d_{threshold} = h_0 * (d_3 + d_1)/2$, i.e., the middle of the eye; i.e., $d_{threshold}$ is a quantity the mean value of which is the ideal threshold. This may be approximated as $$\frac{[d_{threshold(max)} - d_{threshold(min)}]}{2}.$$

The eye opening may be given by:

Eye Opening=$d_{threshold(max)} - d_{threshold(min)}$.

Figure 1B:
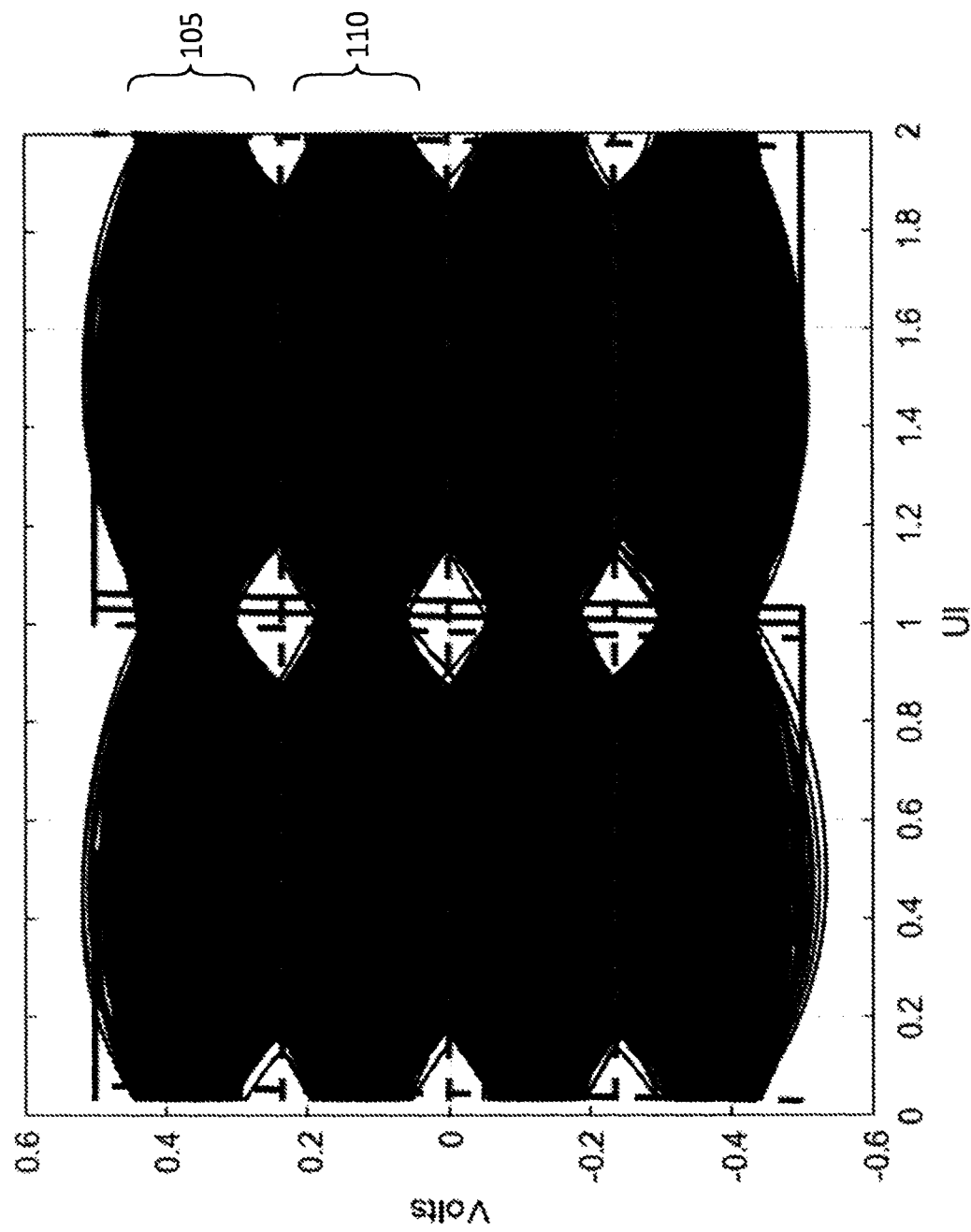
FIG. 1B is an eye diagram, according to an embodiment of the present disclosure.
Figure 2A:
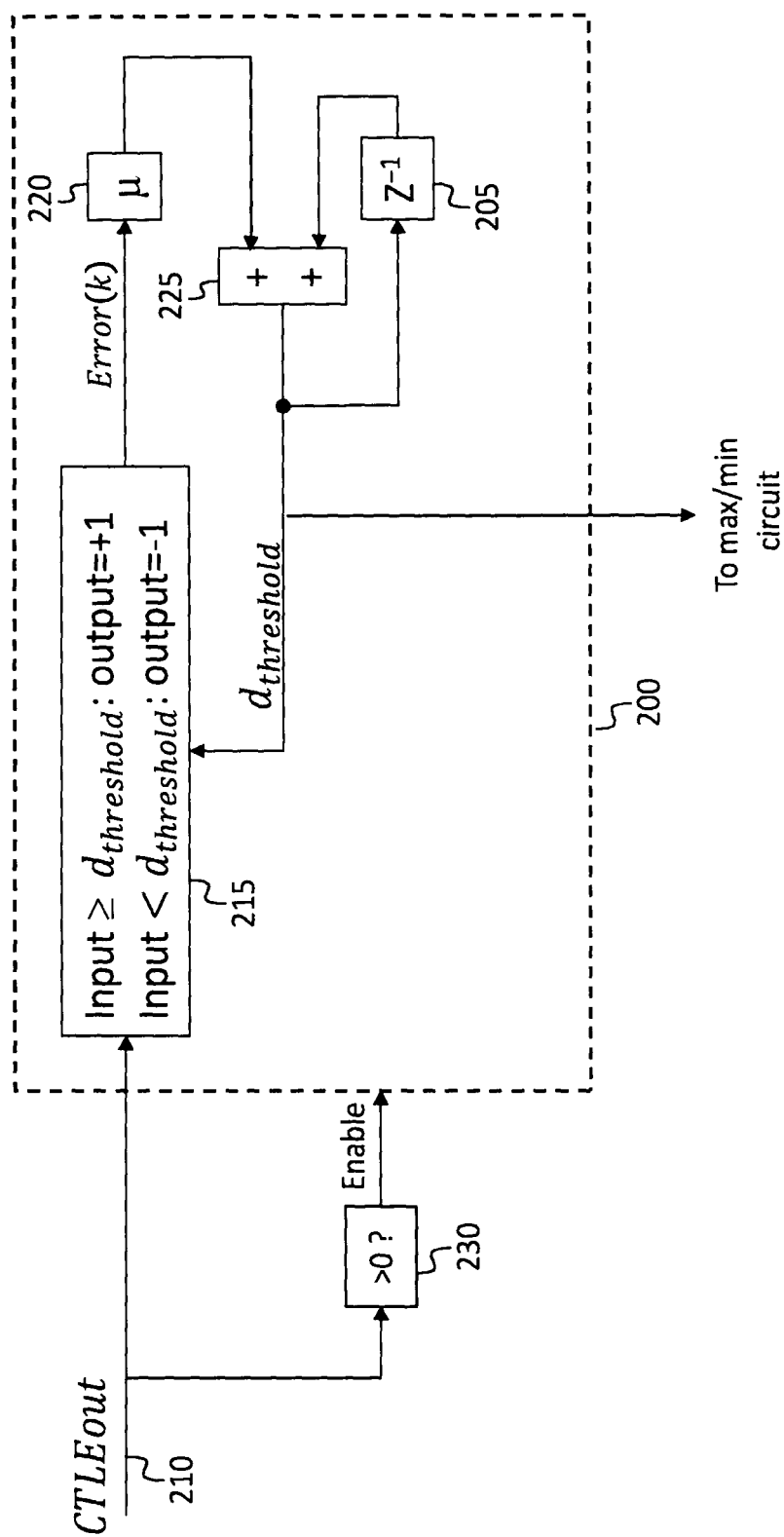
FIG. 2A is a block diagram of a circuit for performing an iterative threshold adjustment, according to an embodiment of the present disclosure.

This method may be employed to find the data slicer threshold and eye opening, for example, for a serial data stream that has a non-zero bias. It may also be used to find data slicer thresholds for serial data encoded with methods such as 4-level Pulse Amplitude Modulation (PAM-4). FIG. 1B depicts an eye diagram for such a serial data stream. In this application, the iterative method described herein may be used for the two upper-most data levels, i.e., for the upper-most data level and the data level below it, with the high data values 105 and the low data values 110 being as shown in FIG. 1B. Data values less than 0V may be disregarded in this process, so that the method generates an estimate (i) of the eye opening of the two upper-most data levels, and (ii) of the mid-point between the two upper-most data levels. Three data slicers may then be used to classify each subsequently received analog data value as belonging to one of the four data levels: (i) an upper slicer having a threshold set equal to the estimated mid-point between the two upper-most data levels, (ii) a middle slicer having a threshold set to 0V, and (iii) a lower slicer having a threshold set equal to the opposite of the estimated mid-point between the two upper-most data levels (i.e., to a voltage having the same absolute value, and the opposite sign, as the voltage to which the threshold of the upper slicer is set). FIG. 2A includes a block diagram of a circuit 200 for performing the iterative threshold adjustment. A register 205 is initialized to the initial value of $d_{threshold}$, and, at the $k^{th}$ iteration, this register 205 stores $d_{threshold}(k)$. When a new analog data value is received at the analog input 210, it is compared, by the data slicer 215, to the current value of the threshold ($d_{threshold}(k)$), producing, at the output of the data slicer 215, a value of 1 if the analog data value is greater than the threshold and a value of −1 if the analog data value is less than the threshold. This output value (Error(k)) is multiplied, in a multiplier 220, by μ and the product is added, in an adder 225, to the value of $d_{threshold}(k)$ stored in the register 205, to generate the updated threshold value $d_{threshold}(k+1)$, which is then stored in the register 205, and fed, as the new threshold, to the data slicer 215. Each of the multiplier 220, the adder 225 and the register 205 may be a fixed-point circuit, with a bit width of between 3 and 20 bits. If μ is equal to $2^{-V}$ where V is an integer, as mentioned above, then the multiplier may be implemented simply as a wire feeding the output of the data slicer to the appropriate binary input (the input to the right of the binary point by V) of the adder 225. A fixed point digital to analog converter (not shown) may be used to convert the digital threshold value to an analog value for use by the data slicer.

When the circuit 200 is used for multi-level modulation (such as PAM-4), an enabling circuit 230 may be used to enable the circuit 200 for performing the iterative threshold adjustment only when the analog data value is in one of the two adjacent levels for which the iterative threshold adjustment is being performed. For example, in the case of PAM-4 modulation, the circuit 200 may be enabled only for the subset of the data values which are positive data values, i.e., for which the analog data value is greater than 0 (and, accordingly, the enabling circuit 230 may test, as shown, whether the analog data value is greater than 0). In some circumstances (e.g., for multi-level modulation in which it is expected (e.g., because of imperfections in the transmitter) that the data levels may not be uniformly spaced, or if a DC bias may be present), the circuit 200 for performing iterative threshold adjustment may be run several times or several such circuits may be run in parallel (with a different enabling criterion each time or for each such circuit), to estimate the respective eye opening and mid-point threshold level for each of several pairs of adjacent data levels.

Figure 2B:
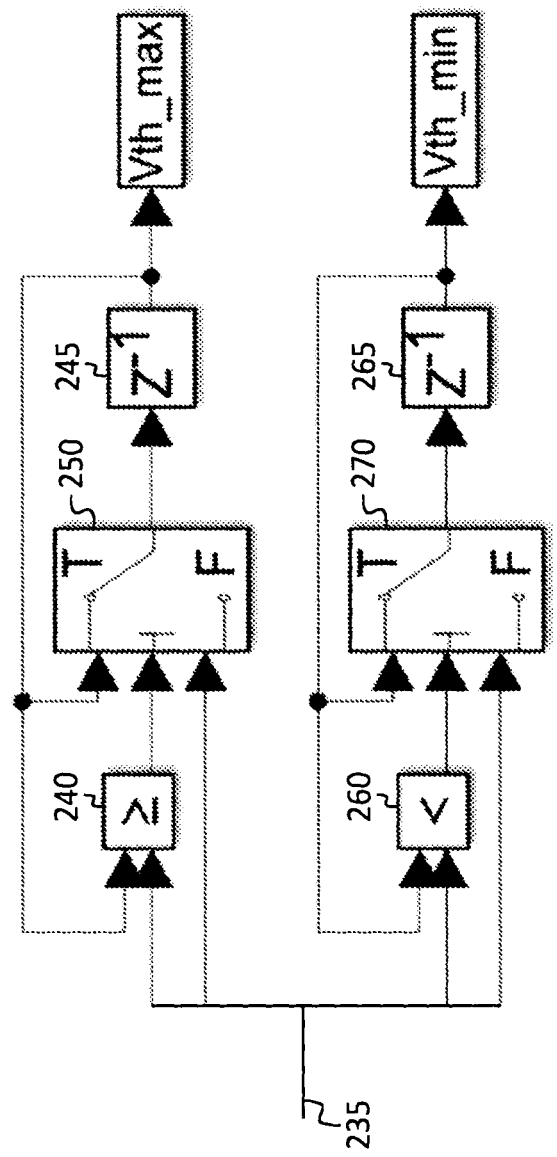
FIG. 2B depicts a circuit for tracking the maximum and minimum values of a data slicer threshold, according to an embodiment of the present disclosure.

FIG. 2B depicts a circuit for tracking the maximum and minimum values of $d_{threshold}$. Each value of $d_{threshold}$ received at the input 235 is compared, in a first comparator 240, to the current maximum value, stored in a first register 245. If the current value of $d_{threshold}$ is greater than or equal to the current maximum value, then the first comparator 240 controls a first multiplexer 250 to replace the value stored in the first register 245 with the current value of $d_{threshold}$. Similarly, each value of $d_{threshold}$ received at the input 235 is compared, in a second comparator 260, to the current minimum value, stored in a second register 265. If the current value of $d_{threshold}$ is less than the current minimum value, then the second comparator 260 controls a second multiplexer 270 to replace the value stored in the second register 265 with the current value of $d_{threshold}$.

Figure 3A:
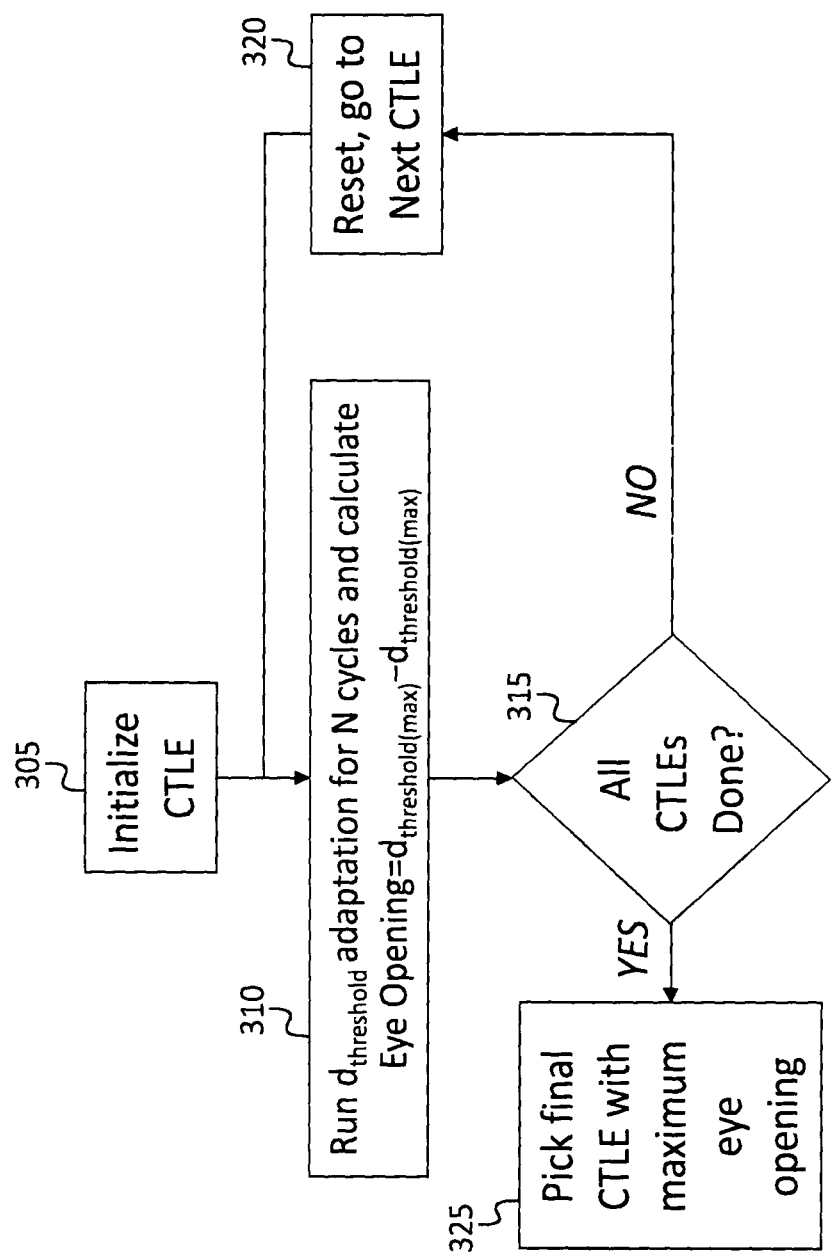
FIG. 3A is a flowchart of a method for setting CTLE parameters, according to an embodiment of the present disclosure.

FIG. 3A is a flowchart of a method for setting CTLE parameters. At 305, the CTLE is initialized with a first set of CTLE parameters, the value of $d_{threshold}$ is initialized (e.g., to a value at the midpoint of the voltage range of the slicer) and the values of $d_{threshold(max)}$ and $d_{threshold(min)}$ are initialized (e.g., to the smallest value and the largest value that the respective registers are able to store). At 310, the iterative adjustment process is then run for a number of iterations N (with N being, e.g., between 100 and $10^6$). The eye opening corresponding to the set of CTLE parameters is then calculated and stored along with an identifier for the set of CTLE parameters to which it corresponds. At 315, it is determined whether all of the sets of CTLE parameters to be tested have been tested; if not, the CTLE is programmed, at 320, with the next set of CTLE parameters, the values of $d_{threshold}$, $d_{threshold(max)}$, and $d_{threshold(min)}$ are re-initialized, and the iterative adjustment process is repeated, at 310. If, at 315, it is determined that all of the sets of CTLE parameters to be tested have been tested then, at 325, the set of CTLE parameters for which the eye opening is greatest is selected for operation (i.e., for receiving data).

Figure 3B:
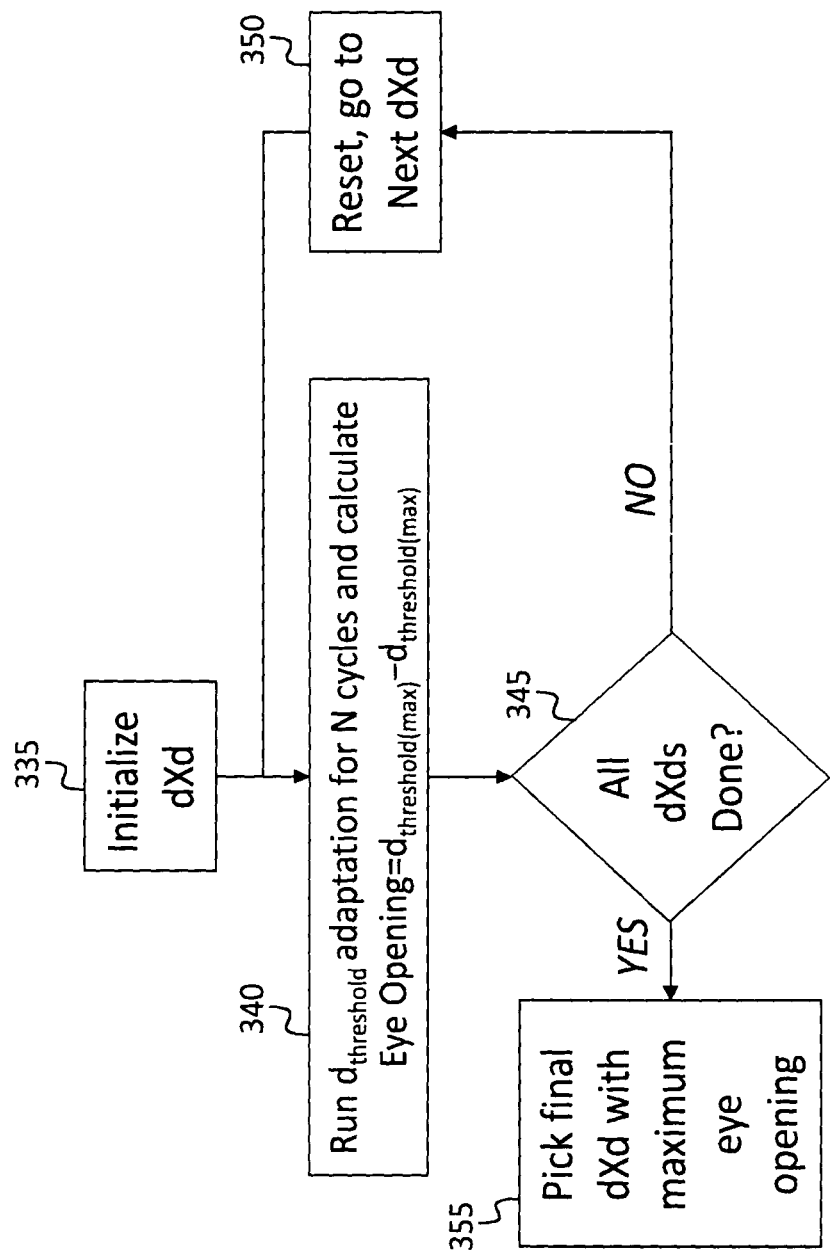
FIG. 3B is a flowchart of a similar method for selecting a clock skew, according to an embodiment of the present disclosure.

FIG. 3B is a flowchart of a similar method for selecting a clock skew dXd (a "clock skew" being a phase difference between a data slicer clock and a crossing slicer clock). At 335, the clock skew is initialized to a first value, the value of $d_{threshold}$ is initialized (e.g., to a value at the midpoint of the voltage range of the slicer) and the values of $d_{threshold(max)}$ and $d_{threshold(min)}$ are initialized (e.g., to the smallest value and the largest value that the respective registers are able to store). At 340, the iterative adjustment process is then run for a number of iterations N (with N being, e.g., between 100 and $10^6$). The eye opening corresponding to the clock skew is then calculated and stored along with an identifier for the clock skew to which it corresponds. At 345, it is determined whether all of the values of clock skew to be tested have been tested; if not, the clock skew is set, at 350, to the next clock skew value to be tested, the values of $d_{threshold}$, $d_{threshold(max)}$, and $d_{threshold(min)}$ are re-initialized, and the iterative adjustment process is repeated, at 340. If, at 345, it is determined that all of the values of clock skew to be tested have been tested then, at 355, the clock skew for which the eye opening is greatest is selected for operation (i.e., for receiving data).

Figure 4:
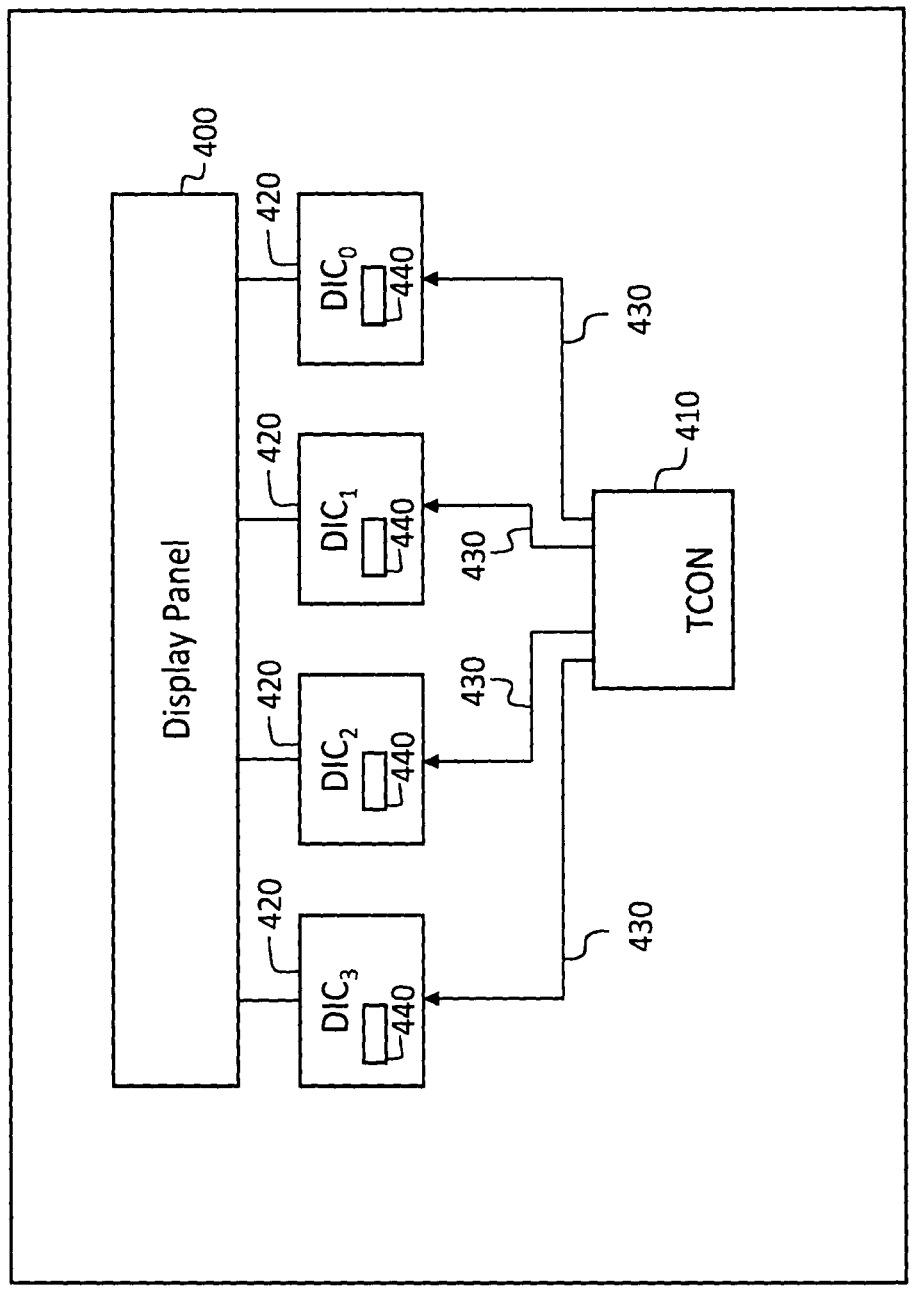
FIG. 4 is a block diagram of a display, according to an embodiment of the present disclosure.

FIG. 4 depicts a display, in accordance with some embodiments. For example, the display may be a video display such as a computer monitor or any other such related display. The display includes a display panel (e.g., an organic light-emitting diode (OLED) display panel) driven by a plurality of driver integrated circuits (ICs) 420. The driver ICs may generate analog drive signals, for driving the pixels of the display, in response to digital data received from a timing controller (TCON) 410, which may send the serial data, encoded according to a method disclosed herein, to the driver ICs over serial data links 430. Each fo the driver ICs 420 may include a processing circuit 440 configured to implement one or more of the methods disclosed herein.

Figure 5:
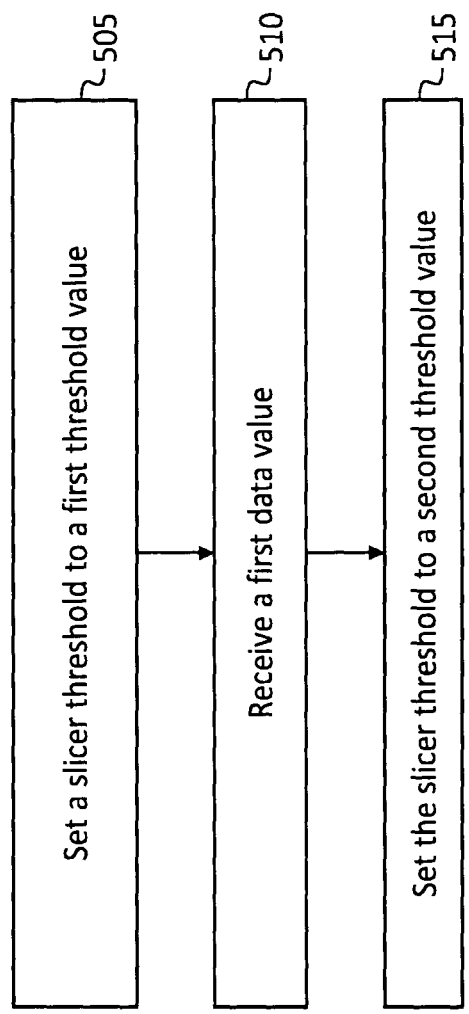
FIG. 5 is a flow chart of a method, according to an embodiment of the present disclosure.

FIG. 5 is a flow chart of a method. In some embodiments, the method includes setting at 505, a threshold of a data slicer to a first threshold value; receiving, at 510, by the data slicer, a first data value; and setting, at 515, the threshold of the data slicer to a second threshold value, the second threshold value being equal to the first threshold value plus a first adjustment, and the adjustment having the same sign as the first data value minus the first threshold value.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B". As used herein, "the difference" between two quantities A and B means A minus B.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for configuring a serial receiver have been specifically described and illustrated herein, many modifications and variations will be apparent to those skilled in the art. Accordingly, it is to be understood that a system and method for configuring a serial receiver constructed according to principles of this disclosure may be embodied other than as specifically described herein. The invention is also defined in the following claims, and equivalents thereof.

What is claimed is:

1. A method for a serial data receiver, comprising:
    setting a threshold of a data slicer to a first threshold value;
    receiving, by the data slicer, a first data value; and
    setting a second threshold value for the threshold of the data slicer based on the first threshold value and the first data value,
    the second threshold value being equal to the first threshold value plus a first adjustment, a sign of the first adjustment being equal to a sign of a first difference, the first difference being the first data value minus the first threshold value.

2. The method of claim 1, further comprising:
    receiving, by the data slicer, a second data value; and
    setting the threshold of the data slicer to a third threshold value,
    the third threshold value being equal to the second threshold value plus a second adjustment, a sign of the second adjustment being equal to a sign of a second difference, the second difference being the second data value minus the second threshold value.

3. The method of claim 1, wherein the first adjustment is within 50% of a constant times a difference between the first data value and the first threshold value.

4. The method of claim 3, wherein the constant is between 0.5 and $2^{-20}$.

5. The method of claim 3, wherein the constant is equal to $2^{-V}$, wherein V is a positive integer between 1 and 20.

6. The method of claim 1, further comprising estimating a first eye opening from a plurality of data values including the first data value.

7. The method of claim 6, comprising calculating a difference between:
    a maximum data value of the plurality of data values and
    a minimum data value of the plurality of data values.

8. The method of claim 6, further comprising estimating a second eye opening, and selecting a second continuous time linear equalizer (CTLE) parameter set for operation,
    wherein:
        a first CTLE parameter set corresponds to the first eye opening,
        the second CTLE parameter set corresponds to the second eye opening, and
        the second eye opening is greater than the first eye opening.

9. The method of claim 6, further comprising estimating a second eye opening, and selecting a second clock skew for operation, the second clock skew being a second phase delay between a data slicer clock and a crossing slicer clock,
    wherein:
        a first clock skew corresponds to the first eye opening, the first clock skew being a first phase delay between the data slicer clock and the crossing slicer clock;
        the second clock skew corresponds to the second eye opening; and
        the second eye opening is greater than the first eye opening.

10. The method of claim 1, wherein the first data value is a data value of a plurality of 4-level Pulse Amplitude Modulation (PAM-4) data values.

11. The method of claim 10, wherein the first data value is a data value of a subset of the plurality of PAM-4 data values, the subset being a set of positive data values of the plurality of PAM-4 data values.

12. A system for a serial data receiver, comprising:
    a processing circuit; and
    memory, operatively connected to the processing circuit and storing instructions that, when executed by the processing circuit, cause the system to perform a method, the method comprising:
        setting a threshold of a data slicer to a first threshold value;
        receiving, by the data slicer, a first data value; and
        setting second threshold value for the threshold of the data slicer based on the first threshold value and the first data value,
        the second threshold value being equal to the first threshold value plus a first adjustment, a sign of the first adjustment being equal to a sign of a first difference, the first difference being the first data value minus the first threshold value.

13. The system of claim 12, wherein the method further comprises:
    receiving, by the data slicer, a second data value; and
    setting the threshold of the data slicer to a third threshold value,
    the third threshold value being equal to the second threshold value plus a second adjustment, a sign of the second adjustment being equal to a sign of a second difference, the second difference being the second data value minus the second threshold value.

14. The system of claim 12, wherein the first adjustment is within 50% of a constant times a difference between the first data value and the first threshold value.

15. The system of claim 14, wherein the constant is between 0.5 and $2^{-20}$.

16. The system of claim 14, wherein the constant is equal to $2^{-V}$, wherein V is a positive integer between 1 and 20.

17. The system of claim 12, wherein the method further comprises estimating a first eye opening from a plurality of data values including the first data value.

18. The system of claim 17, wherein the method comprises calculating a difference between:
   a maximum data value of the plurality of data values and
   a minimum data value of the plurality of data values.

19. The system of claim 17, wherein the method further comprises estimating a second eye opening, and selecting a second continuous time linear equalizer (CTLE) parameter set for operation,
   wherein:
      a first CTLE parameter set corresponds to the first eye opening,
      the second CTLE parameter set corresponds to the second eye opening, and
      the second eye opening is greater than the first eye opening.

20. A display, comprising:
a timing controller; and
a driver integrated circuit,
the driver integrated circuit comprising
   a data slicer;
   a processing circuit; and
   a memory connected to the processing circuit,
the memory storing instructions that, when executed by
   the processing circuit, cause the driver integrated circuit to perform a method for a serial data receiver, the method comprising:
   setting a threshold of the data slicer to a first threshold value;
   receiving, by the data slicer, a first data value; and
   setting a second threshold value for the threshold of the data slicer based on the first threshold value and the first data value,
the second threshold value being equal to the first threshold value plus a first adjustment, a sign of the first adjustment being equal to a sign of a first difference, the first difference being the first data value minus the first threshold value.

* * * * *